US006291781B1

(12) United States Patent
Ohtani et al.

(10) Patent No.: US 6,291,781 B1
(45) Date of Patent: Sep. 18, 2001

(54) COMBINATION WEIGHING AND COUNTING APPARATUS

(75) Inventors: Takafumi Ohtani; Katsuaki Kono, both of Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/573,222

(22) Filed: May 19, 2000

(30) Foreign Application Priority Data

Jun. 2, 1999 (JP) ................................................. 11-155266

(51) Int. Cl.[7] ........................ G01G 19/387; G01G 13/00; G01G 13/04; G01G 23/10
(52) U.S. Cl. ........................ 177/25.18; 177/121; 177/122; 177/185; 177/DIG. 11; 222/77
(58) Field of Search .................................... 177/25.18, 64, 177/65, 94, 102, 103, 104, 120, 121, 122, 185, DIG. 11; 222/55, 56, 77

(56) References Cited

U.S. PATENT DOCUMENTS

| 4,398,612 | * | 8/1983 | Mikami et al. | 177/25.18 |
| 4,600,096 | * | 7/1986 | Yamano et al. | 177/25.18 |
| 4,664,200 | * | 5/1987 | Mikami et al. | 177/25.18 |
| 5,285,930 | * | 2/1994 | Nielson | 177/121 |
| 5,936,206 | * | 8/1999 | Tajiri | 177/25.18 |

* cited by examiner

Primary Examiner—Randy W. Gibson
(74) Attorney, Agent, or Firm—Staas & Halsey LLP (57) ABSTRACT

A combination weighing and counting apparatus includes a plurality of vibrating feeders (1) arranged and mounted on a support frame and adapted to be electrically powered from an alternating current source to transport articles, a plurality of weighing hoppers (28) for measuring respective weights of the articles (M) supplied from the vibrating feeders (1), and a combination selecting device for combining weights or numbers of the articles supplied to the weighing hoppers and for selecting a combination of the articles (M) which falls within a tolerance range. To minimize vibration of the support frame so that any undesirable reduction in weighing accuracy can be suppressed, there is provided a feeder drive control device (42) for driving the neighboring vibrating feeders (1) at a driving phase opposite to each other.

9 Claims, 5 Drawing Sheets

COMBINATION WEIGHING AND COUNTING APPARATUS

BACKGROUND OF THE INVENTION

1. Field of the Invention

The present invention relates to a combination weighing and counting apparatus and, more particularly, to a drive apparatus for at least one vibrating feeder used in the combination weighing and counting apparatus.

2. Description of the Prior Art

Figure 1:
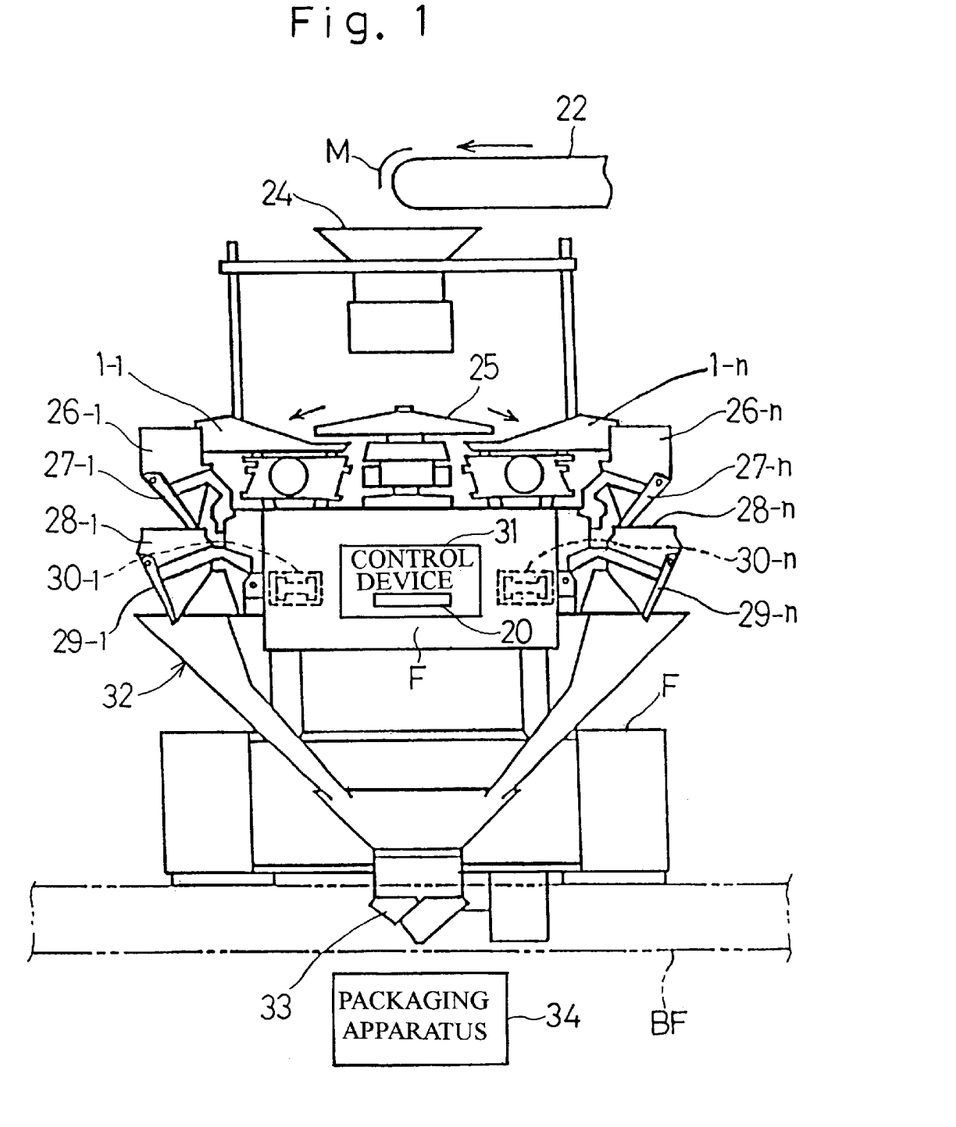
FIG. 1 is a schematic side view of a weighing apparatus according to one preferred embodiment of the present invention.

A combination weighing and counting apparatus utilizing vibrating feeders is shown in a schematic side sectional representation in FIG. 1. The illustrated combination weighing and counting apparatus is supported on a machine base frame BF, and articles M transported by means of a supply conveyor 22 are supplied onto a center portion of a dispensing feeder 25 of a vibrating type through a supply chute 24. A number N of vibrating feeders 1 (1-1 to 1-n) are radially disposed around and in the vicinity of an outer periphery of the dispensing feeder 25 and are so mounted on a frame F, which is in turn supported by the machine base frame BF, as to receive articles M dispensed radially outwardly from the dispensing feeder 25 while the latter is vibrated. The vibrating feeders 1 when vibrated at a predetermined amplitude and a predetermined frequency cause the articles M, received thereby, to move radially outwardly and then fall downwardly onto corresponding pool hoppers 26 (26-1 to 26-n) that are arranged in a circular row on the frame F at respective locations immediately below radially outer ends of the vibrating feeders 1.

The articles M transported by means of the vibrating feeders 1 are, after having been temporarily pooled in the pool hoppers 26 (26-1 to 26-n) and after discharge gates 27 (27-1 to 27-n) of some of the pool hoppers 26 (26-1 to 26-n) that have been subsequently according to a weighing operation has been subsequently opened, supplied onto weighing hoppers 28 (28-1 to 28-n) that are also mounted on the frame F at respective locations immediately below and in alignment with the pool hoppers 26 (26-1 to 26-n). The weight of the articles M within each of the weighing hoppers 28 is measured by a corresponding weight detecting means 30 (30-1 to 30-n) such as a load cell from which a weight detection signal can be outputted. Based on this weight detection signal, a combination calculation is performed by a combination selecting means 20 built in a control device 31, and some of the weighing hoppers 28 which result in the total weight of the articles M in those weighing hoppers 28 that falls within a tolerance range determined based on a target weight are selected, followed by opening of respective discharge gate 29 (29-1 to 29-n) of the selected weighing hoppers 28 with the articles M consequently collected onto associated collecting chutes 32. The articles M so collected in the collecting chutes 32 are then discharged through a timing hopper 33. The articles M discharged from the timing hopper 33 are packaged by a bagging machine 34 in a bag containing the articles M of a total weight equal to or substantially equal to the target weight.

The weighing hoppers 28 that have been emptied as a result of the previously described weighing operation perform the subsequent cycle of weighing operation after the articles have been supplied from the pool hoppers 26 during the subsequent weighing subsequent, and the vibrating feeders 1 that have supplied the articles onto the emptied pool hoppers 26 are simultaneously driven. After a predetermined quantity of articles have been supplied onto the pool hoppers 26, the associated vibrating feeders 1 terminate their delivery operation and are held at a stand-by state. The foregoing operation of the combination weighing apparatus is executed under the control of the control device 31.

Each of the vibrating feeders 1 comprises a vibrating mechanism including an electromagnet powered by an alternating current source, a movable body and leaf springs, and a trough adapted to be vibrated by the vibrating mechanism, wherein the length of time during which an electric power is supplied from the alternating current source to the electromagnet through a switching element comprised of a solid state relay (SSR) is adjusted by controlling the firing angle of the switching element and the articles on the trough are transported by vibrating the trough somewhat diagonally upwardly by the effect of a magnetic force of attraction, developed by the electromagnet, and a force of restoration developed by the leaf springs that are released from the magnetic force of attraction.

As hereinabove discussed, the plural vibrating feeders 1 are disposed radially around the dispensing feeder 25 and are so constructed that some of the vibrating feeders 1 associated with the plural emptied pool hoppers 26 can simultaneously perform transport operations. Since the prior art method of driving the vibrating feeders 1 is such that the plural vibrating feeders 1 can be driven simultaneously and in phase synchronized fashion to each other, the frame F to which the vibrating feeders 1 are mounted undergoes a considerable vibration in a vertical direction, that is, up and down vibration. This up and down vibration of the frame F adversely affects the weight detecting means that is also mounted on the same frame F, resulting in reduction of the weighing accuracy.

SUMMARY OF THE INVENTION

The present invention has been devised to substantially eliminate the above discussed problem and is intended to provide an improved combination weighing and counting apparatus wherein even though the plural vibrating feeders perform transport operations simultaneously, up and down vibration of the frame in a vertical direction can advantageously be minimized to avoid an undesirable reduction in weighing accuracy.

In order to accomplish this object, the present invention in one aspect thereof provides a combination weighing and counting apparatus which comprises a plurality of vibrating feeders for transporting articles; a plurality of weighing hoppers each operable to measure a weight of the articles supplied from the corresponding vibrating feeder; a combination selecting means for combining weights or numbers of the articles supplied to the weighing hoppers and for selecting a combination of the articles which falls within a tolerance range; and a feeder drive control means for driving the neighboring vibrating feeders at a driving phase opposite to each other.

According to the above described structure, since the driving phases of the neighboring vibrating feeders are set to be opposite to each other, vibrations brought about by the neighboring vibrating feeders act to counteract the vibrations of the support frame and the up and down vibration of the support frame on which the vibrating feeders are mounted can be suppressed, accompanied by increase in weighing and counting accuracy.

The present invention according to another aspect thereof also provides a combination weighing and counting apparatus which comprises a plurality of vibrating feeders for transporting articles; a plurality of weighing hoppers each operable to measure a weight of the articles supplied from the corresponding vibrating feeder; a combination selecting means for combining weights or numbers of the articles supplied to the weighing hoppers and for selecting a combination of the articles which falls within a tolerance range; and a feeder drive control means for driving substantially half of the vibrating feeders at a driving phase opposite to the remaining vibrating feeders. The combination selecting means referred to above is operable to select the combination of the weighing hoppers so that the driving phases of the vibrating feeders that supply the articles to the weighing hoppers which have been selected to discharge the articles are brought into a result of the driving phases of some of the vibrating feeders being opposite to those of the remaining vibrating feeders.

According to the above described structure, since a combination of the weighing hoppers is so selected that the driving phases of the vibrating feeders that supply the articles simultaneously to the weighing hoppers which have been selected to discharge the articles are brought into a result of the driving phases of some of the vibrating feeders being opposite to the remaining vibrating feeders, an equal number of the plural vibrating feeders that are activated simultaneously can be activated in a driving phase opposite to each other and the up and down vibration of the support frame on which the vibrating feeders are mounted can be suppressed, accompanied by increase in weighing accuracy.

The present invention according to a further aspect thereof furthermore provides a combination weighing and counting apparatus which comprises a plurality of vibrating feeders for transporting articles; a plurality of weighing hoppers each operable to measure a weight of the articles supplied from the corresponding vibrating feeder; a combination selecting means for combining weights or numbers of the articles supplied to the weighing hoppers and for selecting a combination of the articles which falls within a tolerance range; and a feeder drive control means for driving the vibrating feeders such that the driving phases of the vibrating feeders that supply the articles to the weighing hoppers which have been selected to discharge the articles are brought into a result of the driving phases of some of the vibrating feeders being opposite to those of the remaining vibrating feeders.

According to the above described structure, since the plural vibrating feeders that supply the articles simultaneously to the weighing hoppers which have been selected to discharge the articles are activated so that the driving phases are brought into a result of the driving phases of some of the vibrating feeders being opposite to those of the remaining vibrating feeders, some of the vibrating feeders that supply the articles simultaneously to the weighing hoppers vibrate in a phase opposite to that of the remaining vibrating feeders so as to counteract the vibration of the support frame and the up and down vibration of the support frame can therefore be suppressed, accompanied by increase of the weighing and counting accuracy.

Preferably, the combination weighing and counting apparatus is such that the feeder drive control means includes a firing angle control means. The use of the firing angle control means is advantageous in that the drive control of each of the vibrating feeder can be accomplished by a firing angle control.

Preferably, the combination weighing and counting apparatus may further comprise a zero-cross detecting means for detecting a zero-cross point of an alternating power source, in which case the feeder drive control means also includes a drive timing control means for actuating the firing angle control means based on the zero-cross point detected by the zero-cross detecting means.

Where the zero-cross detecting means is used, the drive timing control means can control the firing angle control means based on the detected zero-cross point to drive the vibrating feeders and, therefore, selection of the drive phases of the vibrating feeders can easily be achieved.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, a first preferred embodiment of the present invention will be described with reference to the accompanying drawings.

Figure 2:
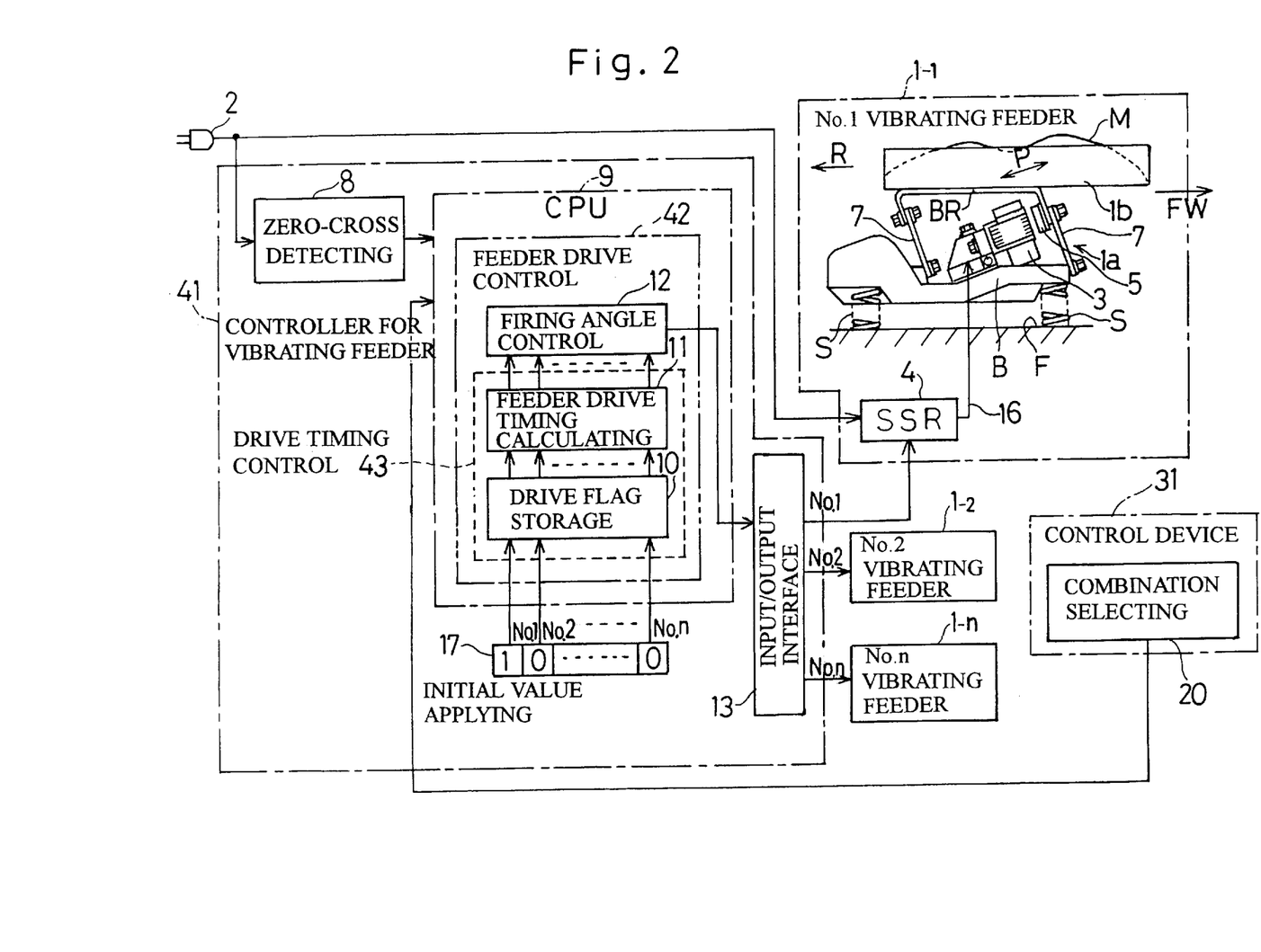
FIG. 2 is a schematic side view of a vibrating feeder according to a first preferred embodiment of the present invention with a controller therefore shown in a block diagram.

A controller for vibrating feeders according to the first preferred embodiment of the present invention, which are used in a combination weighing apparatus shown in FIG. 1, is shown in FIG. 2. Referring to FIG. 2, each of the vibrating feeders 1-1 to 1-n includes a switching element 4 in the form of a solid-state relay (SSR). The controller 41 for controlling respective vibrating phases of the vibrating feeders 1-1 to 1-n includes a zero-cross detecting means 8, a central processing unit (CPU) 9, an input/output interface 13 and an initial value applying means 17. The central processing unit 9 includes a feeder drive control means 42 which in turn includes a firing angle control means 12 and a drive timing control means 43.

The drive timing control means 43 referred to above includes a drive timing calculating means 11 and a drive flag storage means 10.

Each of the vibrating feeders 1 includes a vibrating mechanism 1a and a trough 1b fixed on the vibrating mechanism 1a. The vibrating mechanism 1a is of a structure wherein an electromagnet 3, adapted to be supplied with an electric power from a commercial alternating voltage source 2 through a switching element 4, and respective lower ends of front and rear leaf springs 7 are fixed to a base B, mounted on a frame F of the weighing apparatus, a bracket BR is connected to the leaf springs 7 so as to bridge between respective upper ends of the leaf springs 7, and a movable iron core 5 is fixedly secured to the bracket BR so as to confront the electromagnet 3.

The vibrating feeder 1 of the structure described above can vibrate the trough 1b in a somewhat diagonally upwardly oriented drive direction P to transport articles M on the trough 1b in a forward direction FW (radially outwardly of the apparatus) when the leaf springs 7 are vibrated by the effect of a magnetic force of attraction, that is intermittently generated between the electromagnet 3 and the movable iron core 5, and respective forces of restoration of the leaf springs 7 which act when such magnetic force of attraction is extinguished. The natural frequency of vibration of the vibrating feeder 1 is so set at a value about equal to the frequency of the power source that the trough 1b can be vibrated at a relatively large amplitude with a low electric drive power. Also, the alternating current power applied to the switching element 4 is controlled by a feeder drive control means 42.

A firing angle control means 12 outputs to the switching element 4 a firing signal descriptive of the firing angle corresponding to a target amount of transport to adjust the timing, at which the switching element 4 is triggered on, and the timing at which the switching element 4 is triggered off, to thereby control the electric power to be supplied to the electromagnet 3 so that the amplitude of the vibrating mechanism 1a can be controlled. Also, the length of driving time is controlled by controlling the number of cycles of the alternating current over which the above described operation is driven. By so doing, the amount of transport by the vibrating feeder 1 can be controlled to the target amount of transport. The zero-cross detecting means 8 outputs a zero-cross point detection signal, hereinafter referred to as a ZC signal, each time the zero-cross point of the supply voltage is detected.

Figure 3:
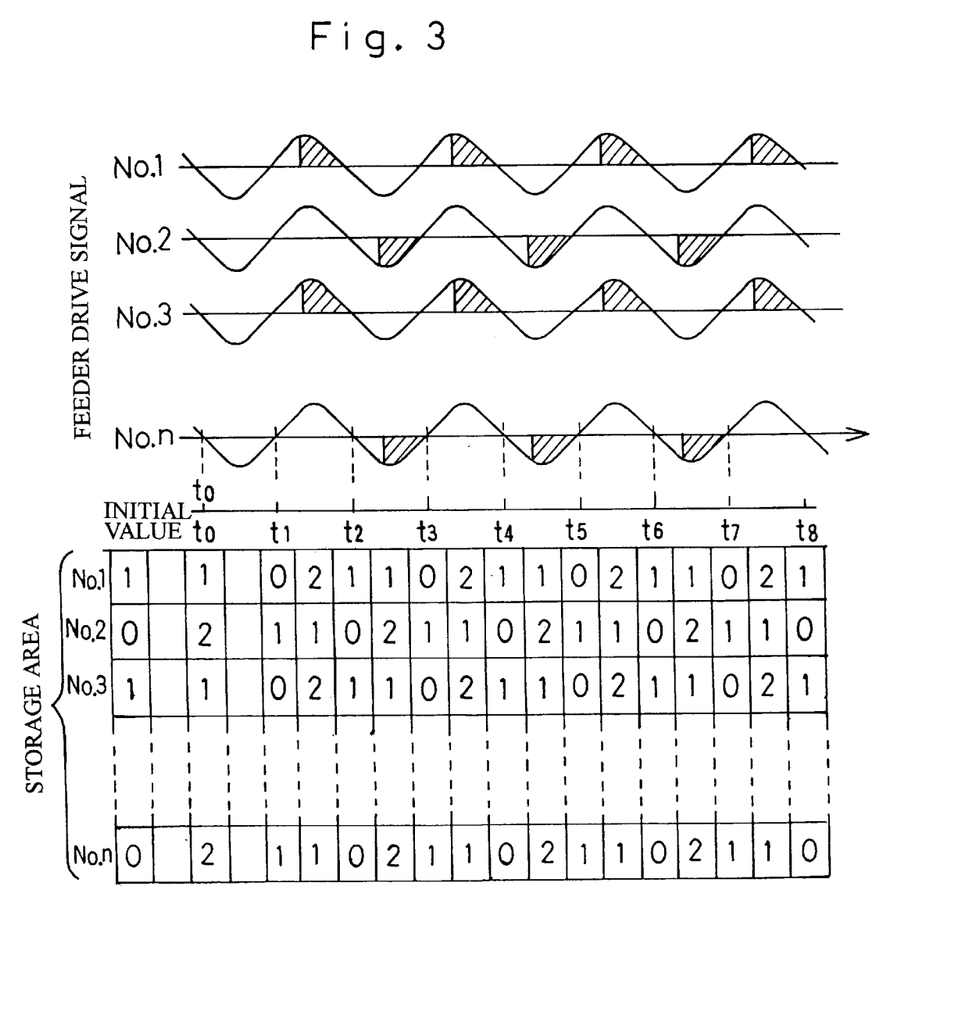
FIG. 3 is a timing chart used to explain a control operation performed by a central processing unit in the embodiment of the present invention.

The drive flag storage means 10 has a number n of storage areas ranging from No. 1 to No. n corresponding to the respective vibrating feeders 1-1 to 1-n, with the No. 1 to No. n storages areas storing respective initial values "1", "0", "1", . . . and "0" that are given by the initial value applying means 17 as shown in FIG. 3. The values in the No. 1 to No. n storage areas of the drive flag storage means 10 are subtracted "−1" each time the ZC signal detected by the zero-cross detecting means 8 is inputted thereto. The drive timing calculating means 11 outputs to the firing angle control means 12 a signal for driving the vibrating feeders corresponding to the storage areas in which the count reads "0", and the firing angle control means 12 controls the switching element 4 of each vibrating feeder through the input/output interface 13.

Hereinafter the drive control operation of the switching element 4 effected by the central processing unit 9 will be described with reference to the timing chart shown in FIG. 3.

As shown in FIG. 3, the No. 1 to No. n storage areas are, before the start of operation, assigned the respective initial values "1", "0", "1", . . . "0" by the initial value applying means 17. In other words, the different initial values are set in the respective storage areas of the neighboring vibrating feeders.

Assuming that a drive start is commanded to the central processing unit 9 at the timing t0, some of the storage areas which are assigned the initial value "0" are advanced to "2" by the drive timing calculating means 11 and, therefore, the No. 1 to No. n storage areas will have the respective initial values "1", "2", "1", . . . "2".

When the ZC signal is subsequently inputted at the timing t1, the respective initial values of the No. 1 to No. n storage areas will have "0", "1", "0", . . . "1", having been subtracted by "1" by the drive timing calculating means 11. The drive timing calculating means 11 applies a firing signal through the firing angle control means 12 and then through the input/output interface 13 to the switching elements 4 of the vibrating feeders 1-1, 1-3, . . . that are associated with the No. 1, No. 3, . . . storage areas whose values have become "0", so that the switching elements 4 can output a signal corresponding to a hatched area in half the cycle of a feeder drive signal 16 for driving the associated vibrating feeder during a period starting from the timing at which the firing signal is inputted to the timing preceding the next succeeding zero-cross point. On the other hand, during this period, the respective values of the No. 1, No. 3, . . . storage areas which have assumed "0" are rewritten to "2" by the drive timing calculating means 11 and, hence will become "2", "1", "2", . . . "1".

Then, when the next succeeding ZC signal is inputted to the drive flag storage means 10 at the timing t2, the respective values of the No. 1 to No. n storage area become "1", "0", "1", . . . "0", having been subtracted by "1". During this half the cycle, to the switching elements 4 of the No. 2, No. 4, . . . No. n vibrating feeders 1-2, 1-4, . . . 1-n corresponding to the storage areas which have become "0", the firing signal is supplied through the firing angle control means 12 and then through the input/output interface 13 and a signal corresponding to the hatched area in half the cycle of the feeder drive signal 16 is outputted until the timing preceding the next succeeding zero-cross point. On the other hand, during this period, the respective values of the No. 2, No. 4, . . . No. n storage areas which have become "0" are written to "2". In this way, the firing angle control means 12 is activated at a timing corresponding to every other zero-cross point and outputs the feeder drive signals 16, which are 180° shifted in phase relative to each other, to the respective switching elements 4 of the odd-numbered and even-numbered vibrating feeders 1. Accordingly, if the total number of the vibrating feeders 1 is an even number, half of them and the rest of them are driven in respective phases opposite to each other, but when the total number of the vibrating feeders 1 is an odd number, the number of the vibrating feeders 1 that are driven in one phase is greater by one than the number of the vibrating feeders 1 that are driven in the opposite phase.

The drive flag storage means 10, the drive timing calculating means 11 and the firing angle control means 12 repeat the above described operation cyclically each time the ZC signal is inputted.

The electromagnet 3 of each of the vibrating feeders 1 exerts a magnetic force of attraction each time the feeder drive signal 16 is applied regardless of whether such feeder drive signal 16 is in a positive phase or whether such feeder drive signal 16 is in a negative phase, to thereby shift the associated trough 1b in a rearward direction R as viewed in FIG. 2 (or in a direction radially inwardly of the apparatus). However, in the absence of the feeder drive signal 16 being applied to the electromagnet 3, a vibrating phase opposite to that when the feeder drive signal 16 is applied is established owing to a restorative force of the leaf springs 7. Since at this moment the feeder drive signal is applied to the next adjacent vibrating feeder, the driving phases of the neighboring vibrating feeders are opposite to each other with vibrating components being counterbalanced to each other. Accordingly, the up and down vibration of the frame F can be suppressed, allotting the combination weighing apparatus to exhibit an increased weighing accuracy.

It is to be noted that in the foregoing first embodiment of the present invention, the half wave control has been described in which for each half cycle of the driving voltage the odd-numbered vibrating feeders and the even-numbered vibrating feeders are activated, a full wave control in which the neighboring vibrating feeders are activated every other cycle, a ⅓ wave control in which the vibrating feeders are activated for each ⅓ wave by updating the respective values of the storage areas of the drive flag storage means 10 to "3" when they become "0", a ¼ wave control in which the vibrating feeders are activated for each ¼ wave by updating the respective values of the storage areas of the drive flag storage means 10 to "4" when they become "0", can equally be employed accompanied by effects similar those brought about by the first embodiment of the present invention.

Figure 4:
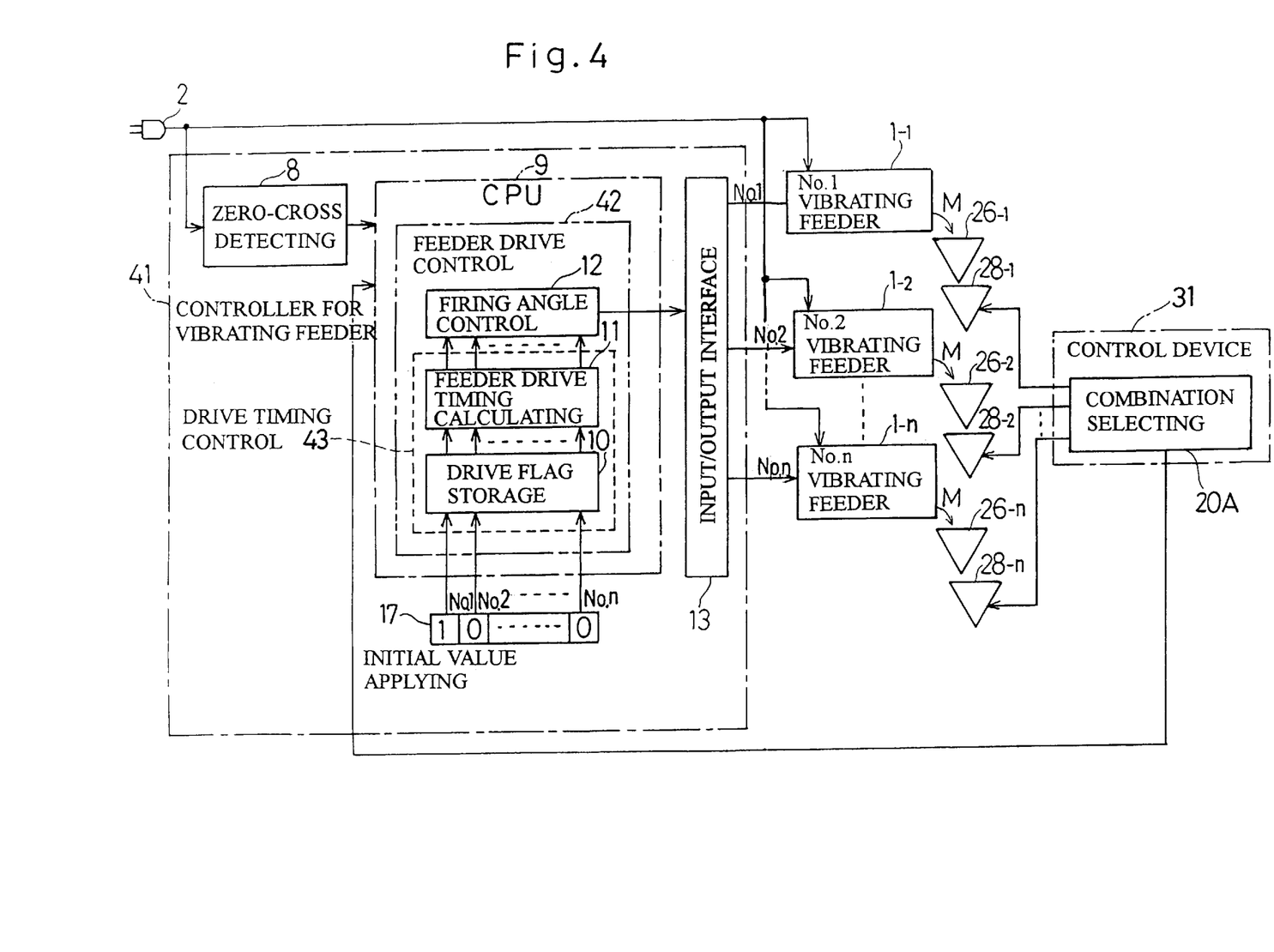
FIG. 4 is a schematic block diagram showing a combination weighing apparatus according to a second preferred embodiment of the present invention.

FIG. 4 illustrates the structure of the combination weighing apparatus according to a second preferred embodiment of the present invention, in which a combination of the odd-numbered weighing hoppers and the even-numbered weighing hoppers is so selected that some of the vibrating feeders that are activated simultaneously can be driven in phase opposite to that of the remaining vibrating feeders. In FIG. 4, component parts similar to those shown in FIG. 2 are designated by like reference numerals used in FIG. 2. Referring to this figure, the vibrating feeders 1-1 to 1-n, the pool hoppers 26-1 to 26-n and the weighing hoppers 28-1 to 28-n are component parts of the combination weighing apparatus shown in FIG. 1. The vibrating feeders 1-1 to 1-n are after all so arranged that the neighboring members of those vibrating feeders are set to operate in respective phases opposite to each other, and half of the total numbers of the vibrating feeders are operated in a phase opposite to the rest of the total numbers of the vibrating feeders. Reference numeral 20A shown in FIG. 4 represents a combination selecting means 20A provided in the control device 31. At the time when a combination of the hoppers 28 which would result in the total weight of the articles falling within the tolerance range determined on the basis of the target combination value is to be selected during the weighing operation, this combination selecting means 20A is operable to select weighing hoppers 28 such that some of the vibrating feeders 1 associated with the some of the weighing hoppers 28 to be selected can activated at a phase opposite to the remaining vibrating feeders 1 associated with the remaining weighing hoppers 28 to be selected. More specifically, the combination selecting means 20A selects the weighing hoppers 28 so that the number of the associated vibrating feeders 1 that are simultaneously activated at a first phase can be equal to the number of the associated vibrating feeders 1 that are activated at a second phase opposite to the first phase. By way of example, selected groups in which the total weights are equal to each other within the tolerance range are specified by the combination selecting means 20A. One of those selected groups is a group (1) including the weighing hoppers 28-1, 28-3, 28-5 and 28-6 whereas the other of those selected groups is a group (2) including the weighing hoppers 28-1, 28-2, 28-6 and 28-7. In such case, the group (2) is finally selected by the combination selecting means 20A. Respective discharge gates of the weighing hoppers 28 of the selected group (2) are opened to discharge the articles from such weighing hoppers 28 of the group (2).

According to the second embodiment, the plural vibrating feeders 1 that are simultaneously activated to supply the articles through the pool hoppers 26 to some of the weighing hoppers 28 selected by the combination selecting means 20A are effective to allow the up and down vibration of the frame F, shown in FIG. 1, to be suppressed with the weighing accuracy of the combination weighing apparatus consequently increased, since some of such plural vibrating feeders 1 are activated in a phase opposite to the phase of the alternating power source used to drive the remaining vibrating feeders 1.

Figure 5:
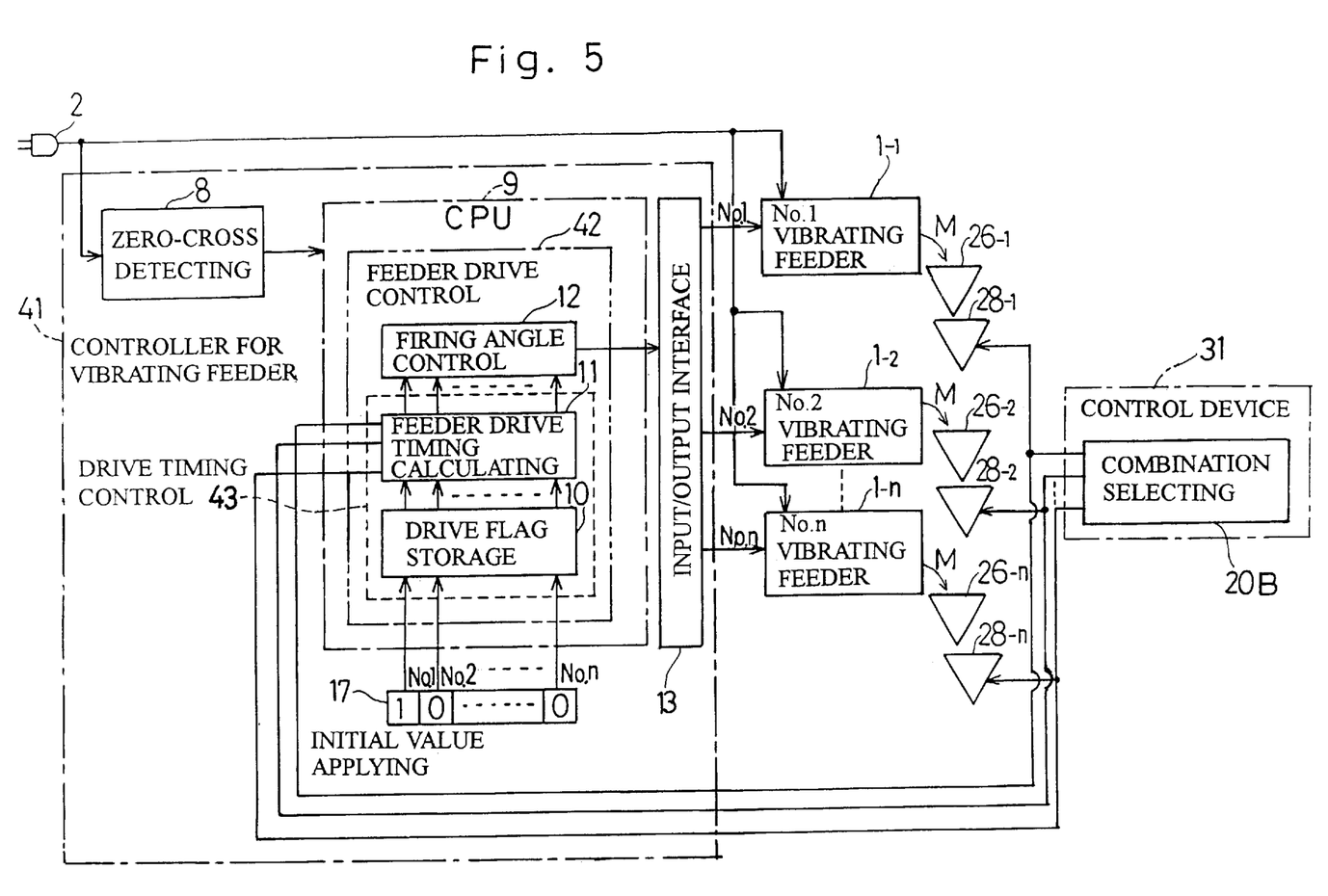
FIG. 5 is a schematic block diagram showing the combination weighing apparatus according to a third preferred embodiment of the present invention.

FIG. 5 illustrates the structure of the combination weighing apparatus according to a third preferred embodiment of the present invention, in which at the time the plural vibrating feeders associated with the selected weighing hoppers are to be activated, some of the vibrating feeders are controlled to vibrate in a phase opposite to that of the remaining vibrating feeders. In FIG. 5, component parts similar to those shown in FIG. 4 are designated by like reference numerals used in FIG. 4. Hereinafter, the operation of the third embodiment that is different from that of the second embodiment shown in FIG. 4 will be described.

During the weighing operation, when the articles are discharged from a combination of the weighing hoppers 28 selected by the combination selecting means 20B, the articles are supplied to the emptied weighing hoppers 28 from the associated pool hoppers 26 during the subsequent cycle of weighing operation. At this time, the respective initial values of the storage areas in the drive flag storage means 10 corresponding to the vibrating feeders 1 to be activated are set by the drive timing calculating means 11. By way of example, in the order from the smallest serial number of the selected plural weighing hoppers 28, "1" and "0" are alternately given and the respective driving timings of those plural vibrating feeders 1 of the selected numbers are controlled.

Thus, by setting the respective values of the storage areas within the drive flag storage means 10, when the respective driving timings of those plural selected vibrating feeders 1 are controlled, the number of the vibrating feeders 1 that are activated simultaneously at a first phase can be equal to or greater by one than the number of the vibrating feeders 1 that are activated simultaneously at a second phase opposite to each other and, accordingly, equal numbers of the plural vibrating feeders 1 that are activated simultaneously vibrate in phase opposite to each other. In this way, the up and down vibration of the frame F shown in FIG. 1 can be suppressed, allowing the combination weighing apparatus to give rise to an increased weighing accuracy.

It is to be noted that in describing each of the preferred embodiment of the present invention, reference has been made to the combination weighing apparatus. However, the present invention can be equally applied to a combination counting apparatus in which the number of articles is determined by dividing the measured value of each of the weighing hoppers by the weight of a single article, performing a combination calculation with respect to the number of items and selecting a combination of the numbers that fall within a tolerance range.

The present invention can also equally be applied not only to the combination weighing and counting apparatus of a round arrangement in which the plural weighing hoppers are arranged in a circular row, but the combination weighing and counting apparatus of an in-line arrangement in which the plural weighing hoppers are arranged in line with each other.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A combination weighing and counting apparatus which comprises:

a plurality of vibrating feeders for transporting articles;

a plurality of weighing hoppers each operable to measure a weight of the articles supplied from the corresponding vibrating feeder;

a combination selecting means for combining weights or numbers of the articles supplied to the weighing hoppers and for selecting a combination of the articles which falls within a tolerance range; and a feeder drive control means for driving the neighboring vibrating feeders at a driving phase opposite to each other.

2. The combination weighing and counting apparatus as claimed in claim 1, wherein each of the vibrating feeders is an electromagnetic vibrating feeder and wherein the feeder drive control means therefore includes a firing angle control means.

3. The combination weighing and counting apparatus as claimed in claim 2, further comprising a zero-cross detecting means for detecting a zero-cross point of an alternating power source and wherein the feeder drive control means also includes a drive timing control means for actuating the firing angle control means based on the zero-cross point detected by the zero-cross detecting means.

4. A combination weighing and counting apparatus which comprises:

a plurality of vibrating feeders for transporting articles;

a plurality of weighing hoppers each operable to measure a weight of the articles supplied from the corresponding vibrating feeder;

a combination selecting means for combining weights or numbers of the articles supplied to the weighing hoppers and for selecting a combination of the articles which falls within a tolerance range; and a feeder drive control means for driving substantially half of the vibrating feeders at a driving phase opposite to the remaining vibrating feeders;

wherein said combination selecting means is operable to select the combination of the weighing hoppers so that the driving phases of the vibrating feeders that supply the articles to the weighing hoppers which have been selected to discharge the articles are brought into a result of the driving phases of some of the vibrating feeders being opposite to those of the remaining vibrating feeders.

5. The combination weighing and counting apparatus as claimed in claim 4, wherein each of the vibrating feeders is an electromagnetic vibrating feeder and wherein the feeder drive control means therefore includes a firing angle control means.

6. The combination weighing and counting apparatus as claimed in claim 5, further comprising a zero-cross detecting means for detecting a zero-cross point of an alternating power source and wherein the feeder drive control means also includes a drive timing control means for actuating the firing angle control means based on the zero-cross point detected by the zero-cross detecting means.

7. A combination weighing and counting apparatus which comprises:

a plurality of vibrating feeders for transporting articles;

a plurality of weighing hoppers each operable to measure a weight of the articles supplied from the corresponding vibrating feeder;

a combination selecting means for combining weights or numbers of the articles supplied to the weighing hoppers and for selecting a combination of the articles which falls within a tolerance range; and a feeder drive control means for driving the vibrating feeders such that the driving phases of the vibrating feeders that supply the articles to the weighing hoppers which have been selected to discharge the articles are brought into a result of the driving phases of some of the vibrating feeders being opposite to those of the remaining vibrating feeders.

8. The combination weighing and counting apparatus as claimed in claim 7, wherein each of the vibrating feeders is an electromagnetic vibrating feeder and wherein the feeder drive control means therefore includes a firing angle control means.

9. The combination weighing and counting apparatus as claimed in claim 8, further comprising a zero-cross detecting means for detecting a zero-cross point of an alternating power source and wherein the feeder drive control means also includes a drive timing control means for actuating the firing angle control means based on the zero-cross point detected by the zero-cross detecting means.

* * * * *